(12) United States Patent
Ohno et al.

(10) Patent No.: US 12,123,703 B2
(45) Date of Patent: Oct. 22, 2024

(54) OPTICAL APPARATUS, OPTICAL INSPECTION METHOD AND NON-TRANSITORY STORAGE MEDIUM

(71) Applicant: KABUSHIKI KAISHA TOSHIBA, Tokyo (JP)

(72) Inventors: Hiroshi Ohno, Tokyo (JP); Takashi Usui, Saitama Saitama (JP); Hiroya Kano, Kawasaki Kanagawa (JP); Hideaki Okano, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/462,829

(22) Filed: Aug. 31, 2021

(65) Prior Publication Data

US 2023/0062169 A1 Mar. 2, 2023
US 2024/0053141 A9 Feb. 15, 2024

(30) Foreign Application Priority Data

Mar. 22, 2021 (JP) .................................. 2021-047701

(51) Int. Cl.
*G01B 11/25* (2006.01)

(52) U.S. Cl.
CPC ................................ *G01B 11/2509* (2013.01)

(58) Field of Classification Search
CPC ..... G01B 11/24; G01B 11/25; G01B 11/2513; G01B 11/0608; G01B 11/14; G01B 11/22; G01B 11/2518; G01B 11/026; G01B 11/2441; G01B 11/002; G01B 11/02; G01B 11/00; G01B 11/2536; G01B 2210/50;
(Continued)

(56) References Cited

U.S. PATENT DOCUMENTS 10,732,102 B2 8/2020 Ohno et al.
2002/0021438 A1 2/2002 Isozaki et al.
(Continued)

FOREIGN PATENT DOCUMENTS

CN 100496395 C * 6/2009 ........... A61B 5/0095
CN 108895985 A * 11/2018 ........... G01B 11/002
(Continued)

OTHER PUBLICATIONS

A. Gatti et al., "Correlated imaging, quantum and classical," Physical Review A, vol. 70, pp. 013802-1 to 013802-10 (2004).
(Continued)

*Primary Examiner* — Michael P Stafira
(74) *Attorney, Agent, or Firm* — Finnegan, Henderson, Farabow, Garrett & Dunner, LLP (57) ABSTRACT

According to an embodiment, an optical apparatus includes an illumination unit, a light-receiving unit and a processing unit. The illumination unit can illuminate an object with a plurality of pattern rays including rays with different wavelengths simultaneously. The light-receiving unit includes a pixel that can receive the rays from the object to disperse at least two of the different wavelengths included in the pattern rays. The processing unit acquires information on the object based on a result of the pixel of the light-receiving unit receiving the pattern rays with which the illumination unit illuminates the object simultaneously.

12 Claims, 4 Drawing Sheets

(58) Field of Classification Search
CPC ............... G01B 11/2509; G01B 9/0209; G01B 11/005; G01B 11/007; G01B 11/30; G01B 11/2527; G01B 11/306; G01B 11/245; G01B 9/02; G01B 9/02044; G01B 11/06; G01B 11/2531; G01B 11/2545; G01B 11/303; G01B 21/047; G01B 21/045; G01B 9/02041; G01B 11/022; G01B 2290/35; G01B 9/04; G01B 11/254; G01B 2210/56; G01B 11/2522; G01B 5/012; G01B 9/02047; G01B 9/02091; G01B 11/0625; G01B 11/2425; G01B 11/272; G01B 5/008; G01B 11/024; G01B 21/042; G01B 11/03; G01B 11/08; G01B 5/0004; G01B 9/02032; G01B 9/02038; G01B 9/02083; G01B 9/02087; G01B 9/021; G01B 11/04; G01B 11/0691; G01B 11/16; G01B 11/2755; G01B 2290/45; G01B 2290/65; G01B 5/20; G01B 9/02027; G01B 9/0203; G01B 11/0675; G01B 11/161; G01B 11/26; G01B 2210/16; G01B 2210/283; G01B 5/0002; G01B 5/28; G01B 9/02007; G01B 9/02045; G01B 11/028; G01B 11/162; G01B 2290/70; G01B 7/012; G01B 9/02003; G01B 9/02014; G01B 9/0205; G01B 9/02063; G01B 9/02069; G01B 11/2408; G01B 11/2433; G01B 15/02; G01B 2290/25; G01B 7/18; G01B 9/02004; G01B 9/02028; G01B 9/02057; G01B 11/0616; G01B 11/0658; G01B 15/00; G01B 2210/143; G01B 2210/146; G01B 2210/22; G01B 2210/286; G01B 2210/44; G01B 2210/48; G01B 2210/52; G01B 9/02019; G01B 9/02021; G01B 9/02048; G01B 9/02054; G01B 9/02065; G01B 9/02068; G01B 9/02075; G01B 9/02084; G01B 9/02089; G01B 9/02094; G01B 9/02098; G01B 11/165; G01B 13/16; G01B 11/18; G01B 9/02015; G01B 9/02043; G01B 9/02072; G01B 9/02077; G01B 9/02085; G01B 9/02097; G01B 11/10; G01B 11/2504; G01B 15/045; G01B 2290/10; G01B 2290/20; G01B 9/027; G01N 35/025; G01N 35/10; G01N 35/1009; G01N 1/28; G01N 1/38; G01N 11/00; G01N 11/16; G01N 15/02; G01N 15/0205; G01N 15/1031; G01N 2001/364; G01N 2011/004; G01N 2021/0389; G01N 2021/058; G01N 2021/1708; G01N 2021/1727; G01N 2021/174; G01N 2021/1787; G01N 2021/3133; G01N 2021/391; G01N 2021/4742; G01N 2021/653; G01N 2021/656; G01N 2033/184; G01N 2035/00742; G01N 2035/00891; G01N 21/272; G01N 21/41; G01N 21/453; G01N 21/75; G01N 21/95607; G01N 21/958; G01N 2201/04; G01N 2201/0616; G01N 2201/0635; G01N 2201/069; G01N 2201/103; G01N 2201/1241; G01N 2203/0075; G01N 2203/0092; G01N 2291/01; G01N 2291/0235; G01N 2291/0251; G01N 2291/0255; G01N 23/223; G01N 2333/165; G01N 2333/31; G01N 2333/32; G01N 27/30; G01N 29/036; G01N 29/041; G01N 29/0672; G01N 29/44; G01N 3/405; G01N 31/22; G01N 33/1826; G01N 33/1866; G01N 33/1893; G01N 33/48; G01N 33/4875; G01N 33/5014; G01N 33/56916; G01N 33/56938; G01N 33/56988; G01N 33/64; G01N 33/6821; G01N 33/6824; G01N 33/6842; G01N 33/74; G01N 9/24; G01N 9/36; G01N 1/18; G01N 1/2214; G01N 11/02; G01N 13/02; G01N 15/042; G01N 2001/022; G01N 2001/2833; G01N 2011/008; G01N 2015/045; G01N 2021/0112; G01N 2021/1729; G01N 2021/258; G01N 2021/434; G01N 2021/437; G01N 2021/4702; G01N 2021/4707; G01N 2021/4773; G01N 2021/6497; G01N 2021/757; G01N 2021/773; G01N 2021/7756; G01N 2021/8472; G01N 2021/8829; G01N 2021/8848; G01N 2030/8809; G01N 2035/00554; G01N 2035/1051; G01N 21/13; G01N 21/431; G01N 21/62; G01N 21/763; G01N 21/783; G01N 21/8422; G01N 21/95; G01N 2201/021; G01N 2201/024; G01N 2201/0634; G01N 2201/0642; G01N 2201/0692; G01N 2201/0695; G01N 2201/0806; G01N 2201/0826; G01N 2201/0833; G01N 2201/0873; G01N 2223/076; G01N 2291/02466; G01N 23/046; G01N 23/20091; G01N 23/207; G01N 23/2076; G01N 23/2255; G01N 2333/37; G01N 2333/70553; G01N 2333/90241; G01N 24/08; G01N 2500/00; G01N 27/00; G01N 2800/042; G01N 2800/323; G01N 29/045; G01N 30/72; G01N 30/7233; G01N 33/225; G01N 33/227; G01N 33/5011; G01N 33/5026; G01N 33/5035; G01N 33/5436; G01N 33/6803; G01N 33/689; G01N 33/9446; G01N 35/00; G01N 35/00594; G01N 35/08; G01N 35/1065; G01N 9/002; G01N 1/405; G01N 15/05; G01N 2015/0222; G01N 2015/1415; G01N 2015/145; G01N 2021/0339; G01N 2021/152; G01N 2021/157; G01N 2021/1736; G01N 2021/1753; G01N 2021/1757; G01N 21/6428; G01N 2021/6419; G01N 2021/6421; G01N 2021/6439; G01N 21/648; G01N 21/6452; G01N 33/582; G01N 21/6456; G01N 21/6458; G01N 2021/6441; G01N 21/31; G01N 21/64; G01N 21/6486; G01N 2201/06113; G01N 21/645; G01N 21/6454; G01N 2201/062; G01N 21/35; G01N 21/3563; G01N 21/359; G01N 33/49; G01N 21/65; G01N 2201/08; G01N 15/1475; G01N 2015/1006; G01N 15/1429; G01N 2201/0612; G01N 2201/12; G01N 15/1434; G01N 21/3504; G01N 21/6408; G01N 15/1463; G01N 2201/068; G01N 15/1459; G01N 2015/1472; G01N 21/27; G01N 21/39; G01N 2021/3595; G01N 21/4795; G01N 2015/144; G01N 2201/0221; G01N 21/7743; G01N 2201/129; G01N 21/3577; G01N 2021/6491; G01N 2015/1477; G01N 33/15; G01N 2021/7786; G01N 21/7746; G01N 2021/6478; G01N 21/658; G01N 2201/02; G01N 2015/1075; G01N 2015/1497; G01N 2015/1486; G01N 2015/1493; G01N 2021/6471; G01N 2201/125; G01N 21/85; G01N 2021/6463; G01N 33/54373; G01N 2015/1452; G01N 33/588; G01N 2021/399; G01N 21/253; G01N 21/255; G01N 21/88; G01N 1/2813; G01N 15/147; G01N 2015/149; G01N 2021/1793; G01N 2021/6417; G01N 1/30; G01N 15/1427; G01N 15/1484; G01N 2021/6482; G01N 21/49; G01N 21/8851; G01N 21/51; G01N 2201/061; G01N 2015/0073; G01N 2015/0084; G01N 2015/1445; G01N 21/274; G01N 2201/064; G01N 33/487; G01N 33/533; G01N 15/0227; G01N 15/14; G01N 2021/6432; G01N 21/9027; G01N 2015/1087; G01N 33/483; G01N 33/02; G01N 21/0303; G01N 21/21; G01N 29/2418; G01N 33/4833; G01N 21/45; G01N 33/442; G01N 2021/1765; G01N 21/76; G01N 2201/0627; G01N 2015/0065; G01N 2021/0346; G01N 21/17; G01N 21/1702; G01N 21/01; G01N 33/54366; G01N 33/58; G01N 21/314; G01N 21/3581; G01N 33/53; G01N 15/00; G01N 21/1717; G01N 33/025; G01N 33/5094; G01N 21/00; G01N 2201/0696; G01N 21/25; G01N 21/9508; G01N 33/5308; G01N 1/312; G01N 2021/3181; G01N 21/0332; G01N 21/3151; G01N 2015/1488; G01N 2021/3137; G01N 21/7703; G01N 21/553; G01N 21/77; G01N 35/00732; G01N 35/00871; G01N 15/1436; G01N 2001/2276; G01N 21/636; G01N 33/56972; G01N 21/031; G01N 21/552; G01N 2201/0675; G01N 33/56966; G01N 2021/3531; G01N 21/47; G01N 27/122; G01N 27/128; G01N 27/4146; G01N 7/4148; G01N 33/0034; G01N 2015/008; G01N 2021/3144; G01N 2021/6484; G01N 21/6402; G01N 33/54326; G01N 35/00029; G01N 2021/0325; G01N 2021/3159; G01N 21/474; G01N 2800/2821; G01N 33/54346; G01N 2021/158; G01N 33/497; G01N 33/54313; G01N 33/587; G01N 33/6896; G01N 2001/2244; G01N 2021/0118; G01N 2021/0181; G01N 2021/6423; G01N 2033/4975; G01N 21/03; G01N 21/15; G01N 21/59; G01N 21/63; G01N 21/8483; G01N 2201/0446; G01N 2333/4709; G01N 33/543; G01N 33/54386; G01N 15/0612; G01N 2021/8466; G01N 21/3554; G01N 21/69; G01N 2201/067; G01N 2333/195; G01N 33/48721; G01N 33/50; G01N 1/36; G01N 2001/2223; G01N 2035/00881; G01N 21/05; G01N 21/33; G01N 9/00; G01N 15/06; G01N 2015/1465; G01N 2021/3513; G01N 21/278; G01N 21/55; G01N 21/554; G01N 21/5907; G01N 2201/0697; G01N 2291/02836; G01N 2291/02872; G01N 29/0681; G01N 30/74; G01N 33/542; G01N 1/2202; G01N 15/1468; G01N 2021/0321; G01N 2021/1725; G01N 2021/638; G01N 2021/655; G01N 2035/009; G01N 21/4788; G01N 21/84; G01N 2570/00; G01N 27/623; G01N 2800/26; G01N 30/88; G01N 33/5005; G01N 33/54306; G01N 33/54353; G01N 33/92; G01N 2021/7793; G01N 2035/00138; G01N 2035/00752; G01N 21/8507; G01N 21/8806; G01N 21/94; G01N 2405/00; G01N 2405/04; G01N 2405/08; G01N 27/624; G01N 3/00; G01N 30/724; G01N 33/48735; G01N 33/566; G01N 33/6848; G01N 33/6851; G01N 33/80; G01N 35/1095; G01N 1/06; G01N 1/286; G01N 2001/2873; G01N 2015/0693; G01N 2030/8813; G01N 21/4738; G01N 21/78; G01N 33/502; G01N 33/532; G01N 35/1002; G01N 1/31; G01N 2001/302; G01N 2015/1438; G01N 21/171; G01N 2201/0691; G01N 2333/70596; G01N 2800/2835; G01N 33/493; G01N 33/5091; G01N 35/00613; G01N 2021/3155; G01N 2030/8822; G01N 2030/8886; G01N 21/3103; G01N 21/532; G01N 21/643; G01N 2201/0214; G01N 2201/105; G01N 2333/726; G01N 30/02; G01N 30/8651; G01N 30/8672; G01N 30/8686; G01N 33/54333; G01N 33/552; G01N 33/72; G01N 35/00663; G01N 2001/002; G01N 2015/0011; G01N 2015/0076; G01N 2015/1081; G01N 2021/1706; G01N 2021/3148; G01N 2021/4709; G01N 2021/4797; G01N 2035/00039; G01N 2035/00861; G01N 21/251; G01N 21/53; G01N 21/87; G01N 2201/12723; G01N 2800/2814; G01N 2800/2828; G01N 2800/2842; G01N 2800/285; G01N 33/569; G01N 33/583; G01N 35/00603; G01N 35/028; G01N 1/2273; G01N 2015/0038; G01N 2015/1495; G01N 2021/479; G01N 2035/00673; G01N 2201/0216; G01N 2201/0638; G01N 2201/1296; G01N 2291/0256; G01N 2291/106; G01N 2333/00; G01N 30/00; G01N 30/46; G01N 33/57419; G01N 33/57492; G01N 35/00722; G01N 35/0099; G01N 35/1016; G01N 1/2226; G01N 2021/3129; G01N 2021/317; G01N 2021/458; G01N 2035/00237; G01N 21/631; G01N 21/68; G01N 2201/084; G01N 2201/10; G01N 2201/1293; G01N 2333/33; G01N 2496/15; G01N 33/0098; G01N 33/5008; G01N 33/54393; G01N 33/57407; G01N 33/68; G01N 33/6818; G01N 33/96; G01N 35/04; G01N 15/0211; G01N 2015/0092; G01N
2015/1447; G01N 2021/3174; G01N
2021/7753; G01N 2021/7783; G01N
2035/00158; G01N 2035/00326; G01N
2035/00356; G01N 21/4785; G01N
21/956; G01N 2201/082; G01N
27/44791; G01N 2800/7028; G01N
29/0609; G01N 29/0654; G01N 29/265;
G01N 33/4925; G01N 33/553; G01N
33/574; G01N 33/66; G01N 15/0656;
G01N 15/1056; G01N 2001/245; G01N
2021/1714; G01N 2021/1731; G01N
2021/1795; G01N 2021/396; G01N
2021/4735; G01N 2021/4778; G01N
21/276; G01N 21/6489; G01N 21/67;
G01N 21/80; G01N 2201/0245; G01N
2201/0633; G01N 2201/0636; G01N
2201/12707; G01N 23/083; G01N
23/087; G01N 2458/10; G01N 27/041;
G01N 29/06; G01N 29/46; G01N 33/24;
G01N 33/241; G01N 33/558; G01N
33/56911; G01N 33/56983; G01N
33/57411; G01N 33/581; G01N 33/585;
G01N 33/6812; G01N 33/84; G01N
15/1425; G01N 2001/021; G01N
2015/0046; G01N 2015/1454; G01N
2021/3568; G01N 2021/646; G01N
2021/8592; G01N 2021/8845; G01N
2021/945; G01N 21/95692; G01N
2201/0683; G01N 2223/306; G01N
2223/401; G01N 2223/402; G01N
2223/405; G01N 2223/615; G01N
2223/623; G01N 2223/645; G01N
2291/02475; G01N 27/07; G01N
27/3278; G01N 33/004; G01N 33/5438;
G01N 35/02; G01N 1/2806; G01N 1/34;
G01N 1/4077; G01N 15/0255; G01N
15/0266; G01N 15/1404; G01N 15/1456;
G01N 2001/4088; G01N 2013/0241;
G01N 2015/0288; G01N 2015/1402;
G01N 2021/0106; G01N 2021/035; G01N
2021/1734; G01N 2021/1761; G01N
2021/178; G01N 2021/3166; G01N
2021/451; G01N 2021/634; G01N
2021/7709; G01N 2021/7733; G01N
2021/845; G01N 2021/8887; G01N
2021/95676; G01N 2033/0093; G01N
2035/00495; G01N 2035/0405; G01N
2035/0462; G01N 2035/0465; G01N
2035/0489; G01N 2035/0491; G01N
2035/1025; G01N 2035/1032; G01N
21/3586; G01N 21/6447; G01N
2201/0628; G01N 2201/0853; G01N
2201/124; G01N 2201/12776; G01N
2333/245; G01N 2333/9015; G01N
2458/00; G01N 2458/40; G01N 2520/00;
G01N 27/3271; G01N 27/44721; G01N
2800/52; G01N 29/24; G01N 33/492;
G01N 33/5058; G01N 33/5076; G01N
33/5088; G01N 33/52; G01N 33/5302;
G01N 33/551; G01N 33/554; G01N
33/57484; G01N 35/00584; G01N
35/021; G01N 2021/3177; G01N
2021/4764; G01N 2021/5957; G01N
2021/6443; G01N 2021/6465; G01N 2021/6467; G01N 2021/6493; G01N
2021/7779; G01N 2021/8411; G01N
2021/8816; G01N 2021/8825; G01N
2021/8835; G01N 2021/8854; G01N
2021/9513; G01N 2035/00782; G01N
2035/0406; G01N 21/256; G01N 21/61;
G01N 21/6445; G01N 21/898; G01N
21/90; G01N 21/9009; G01N 21/9036;
G01N 2201/06193; G01N 2201/0625;
G01N 2201/0639; G01N 2201/101; G01N
2201/127; G01N 2201/12761; G01N
2223/04; G01N 2223/045; G01N
2223/0568; G01N 2223/417; G01N
2223/419; G01N 2223/612; G01N
2333/01; G01N 2333/11; G01N 2333/115;
G01N 2333/38; G01N 2333/4703; G01N
2333/4712; G01N 2333/475; G01N
2333/7051; G01N 2333/70514; G01N
2333/70517; G01N 2333/912; G01N
2333/938; G01N 2500/10; G01N
27/3272; G01N 27/3274; G01N 27/622;
G01N 2800/24; G01N 30/95; G01N
33/0004; G01N 33/0027; G01N 33/0036;
G01N 33/0047; G01N 33/0062; G01N
33/0075; G01N 33/08; G01N 33/12;
G01N 33/18; G01N 33/5041; G01N
33/5047; G01N 33/5079; G01N 33/525;
G01N 33/5304; G01N 33/56961; G01N
33/573; G01N 33/57426; G01N 33/577;
G01N 33/60; G01N 33/6863; G01N
33/6869; G01N 33/6872; G01N 33/6887;
G01N 33/94; G01N 35/00623; G01N
35/00693; G01J 3/2823; G01J 3/42; G01J
3/2803; G01J 3/28; G01J 3/10; G01J
3/02; G01J 2003/2826; G01J 3/0218;
G01J 3/0205; G01J 3/0208; G01J 3/36;
G01J 3/108; G01J 2003/1213; G01J
3/021; G01J 3/0264; G01J 3/14; G01J
3/0229; G01J 3/453; G01J 3/26; G01J
3/4406; G01J 3/0256; G01J 2003/104;
G01J 3/0224; G01J 3/0272; G01J 3/44;
G01J 3/18; G01J 3/1838; G01J 3/32;
G01J 5/10; G01J 3/0237; G01J 5/20;
G01J 3/0289; G01J 3/45; G01J 3/427;
G01J 2003/2866; G01J 2003/1208; G01J
3/0216; G01J 3/027; G01J 3/0291; G01J
3/513; G01J 2005/0077; G01J 3/0286;
G01J 3/433; G01J 2003/2806; G01J
3/0275; G01J 3/0297; G01J 3/12; G01J
5/0853; G01J 1/04; G01J 3/4412; G01J
1/42; G01J 1/429; G01J 3/0213; G01J
3/447; G01J 2003/1239; G01J 3/06; G01J
3/0294; G01J 2003/106; G01J 2005/202;
G01J 3/0248; G01J 3/2846; G01J 3/51;
G01J 5/0806; G01J 5/24; G01J 2003/123;
G01J 3/50; G01J 2003/1217; G01J
3/4531; G01J 3/502; G01J 2003/1282;
G01J 3/00; G01J 3/0259; G01J 1/0437;
G01J 2003/064; G01J 3/08; G01J 3/1804;
G01J 4/04; G01J 1/0228; G01J 1/58;
G01J 2003/425; G01J 3/0262; G01J
3/443; G01J 5/024; G01J 1/4204; G01J
3/04; G01J 3/1256; G01J 1/4228; G01J
11/00; G01J 3/0221; G01J 3/1895; G01J
5/0014; G01J 5/0802; G01J 5/0803; G01J 5/0808; G01J 3/0245; G01J 5/023; G01J
5/0818; G01J 1/02; G01J 1/0492; G01J
1/44; G01J 2003/1278; G01J 2003/423;
G01J 2003/468; G01J 3/0202; G01J
3/024; G01J 3/2889; G01J 3/40; G01J
5/046; G01J 5/07; G01J 9/02; G01J
2003/102; G01J 2003/2813; G01J 3/0227;
G01J 3/4535; G01J 3/46; G01J 3/524;
G01J 5/0881; G01J 5/34; G01J 5/44;
G01J 1/0271; G01J 1/0429; G01J 1/08;
G01J 1/4257; G01J 2003/1234; G01J
2003/2859; G01J 2005/607; G01J 5/02;
G01J 5/0896; G01J 5/60; G01J 9/0246;
G01J 1/0219; G01J 2003/1226; G01J
2005/106; G01J 3/1809; G01J 5/026;
G01J 5/061; G01J 9/00; G01J 1/0204;
G01J 1/0403; G01J 1/0488; G01J 1/46;
G01J 2001/4247; G01J 2001/4261; G01J
2001/444; G01J 2003/062; G01J
2003/1221; G01J 2003/2816; G01J
2003/283; G01J 2003/4424; G01J 3/0232;
G01J 3/0243; G01J 3/457; G01J 3/462;
G01J 5/48; G01J 5/59; G01J 1/0411;
G01J 1/18; G01J 2003/2869; G01J
2005/204; G01J 2005/283; G01J 3/0235;
G01J 3/30; G01J 3/4338; G01J 5/047;
G01J 5/08021; G01J 5/0804; G01J 5/28;
G01J 5/58; G01J 1/0209; G01J 1/0418;
G01J 1/20; G01J 2001/0481; G01J
2001/446; G01J 2003/066; G01J
2003/467; G01J 3/4532; G01J 5/00; G01J
5/06; G01J 5/22; G01J 1/00; G01J
1/0266; G01J 1/0295; G01J 2001/4266;
G01J 2001/4466; G01J 2003/2836; G01J
2005/206; G01J 2005/583; G01J 3/0283;
G01J 3/463; G01J 3/465; G01J 3/501;
G01J 5/0225; G01J 5/03; G01J 5/045;
G01J 5/08; G01J 5/0815; G01J 5/0837;
G01J 5/0865; G01J 5/602; G01J 9/04;
G02B 5/201; G02B 21/16; G02B 21/367;
G02B 6/0073; G02B 6/0051; G02B 5/22;
G02B 6/0023; G02B 6/0025; G02B
21/0076; G02B 5/223; G02B 5/20; G02B
27/58; G02B 5/208; G02B 21/365; G02B
27/0172; G02B 21/361; G02B 21/008;
G02B 5/3016; G02B 21/0064; G02B
5/3083; G02B 6/005; G02B 21/06; G02B
5/008; G02B 21/0032; G02B 5/30; G02B
2027/0138; G02B 2027/0187; G02B
27/0093; G02B 2027/014; G02B
2027/0178; G02B 23/2469; G02B 26/001;
G02B 5/285; G02B 2207/101; G02B
27/145; G02B 21/0028; G02B 6/4226;
G02B 27/149; G02B 27/283; G02B 5/26;
G02B 6/0021; G02B 5/28; G02B 6/0041;
G02B 1/14; G02B 21/0056; G02B
26/0833; G02B 27/10; G02B 27/1046;
G02B 27/48; G02B 6/13; G02B 21/002;
G02B 27/0927; G02B 6/0061; G02B
21/082; G02B 27/017; G02B 5/204;
G02B 6/0076; G02B 1/002; G02B 1/02;
G02B 27/285; G02B 6/0068; G02B
21/0004; G02B 21/0048; G02B 26/0808;
G02B 5/1828; G02B 1/04; G02B 23/12;
G02B 23/2461; G02B 27/0101; G02B
5/32; G02B 6/0056; G02B 1/11; G02B
2027/0194; G02B 21/0012; G02B 26/101;
G02B 27/0176; G02B 27/30; G02B 5/23;
G02B 5/288; G02B 6/0031; G02B 1/10;
G02B 21/0092; G02B 26/005; G02B
27/0179; G02B 27/1013; G02B 6/0008;
G02B 6/0055; G02B 1/005; G02B
2027/0125; G02B 21/006; G02B 21/084;
G02B 23/24; G02B 23/26; G02B 26/10;
G02B 27/0994; G02B 27/646; G02B
6/0006; G02B 6/001; G02B 6/2931;
G02B 6/3538; G02B 2027/0174; G02B
2027/0185; G02B 21/0084; G02B 21/26;
G02B 27/0972; G02B 27/123; G02B
27/286; G02B 5/0242; G02B 5/206;
G02B 19/0028; G02B 21/36; G02B
27/01; G02B 27/1006; G02B 5/207;
G02B 5/286; G02B 5/3058; G02B
6/0026; G02B 6/4214; G02B 6/4225;
G02B 6/4246; G02B 6/4257; G02B 6/43;
G02B 2006/12083; G02B 2006/12138;
G02B 21/0072; G02B 21/0088; G02B
21/0096; G02B 21/14; G02B 2207/123;
G02B 3/14; G02B 5/003; G02B 5/02;
G02B 5/203; G02B 5/281; G02B 5/3033;
G02B 5/305; G02B 6/0053; G02B
6/0229; G02B 6/12; G02B 7/02; G02B
7/08; G02B 7/09; G02B 19/0014; G02B
19/0047; G02B 19/0061; G02B
2006/1213; G02B 21/04; G02B 21/08;
G02B 21/18; G02B 21/241; G02B
26/026; G02B 27/142; G02B 30/25;
G02B 5/1814; G02B 5/1866; G02B
6/0038; G02B 6/0065; G02B 6/0078;
G02B 13/24; G02B 2027/011; G02B
2027/0121; G02B 2027/0196; G02B
21/0016; G02B 21/025; G02B 2207/113;
G02B 23/2407; G02B 26/08; G02B
26/12; G02B 26/123; G02B 27/0025;
G02B 27/09; G02B 27/0911; G02B
27/0955; G02B 27/14; G02B 27/18;
G02B 27/4244; G02B 3/0056; G02B
5/00; G02B 5/001; G02B 5/1809; G02B
5/3091; G02B 6/0005; G02B 6/0013;
G02B 6/0016; G02B 6/0036; G02B
6/0043; G02B 6/0086; G02B 6/12007;
G02B 6/29389; G02B 6/3598; G02B
6/3624; G02B 7/00; G02B 13/0095;
G02B 13/146; G02B 13/22; G02B
19/0066; G02B 19/0095; G02B
2006/12102; G02B 2006/12123; G02B
2027/0105; G02B 2027/0112; G02B
2027/0118; G02B 2027/0134; G02B
2027/0141; G02B 21/00; G02B 21/004;
G02B 21/0068; G02B 2207/114; G02B
23/2423; G02B 26/127; G02B 27/0103;
G02B 27/1073; G02B 27/141; G02B
30/23; G02B 5/0226; G02B 5/0278;
G02B 5/04; G02B 5/205; G02B 5/3075;
G02B 6/0003; G02B 6/122; G02B
6/1226; G02B 6/132; G02B 6/136; G02B
6/29343; G02B 6/3596; G02B 6/4215;
G02B 6/4298; G02B 7/32; G02B 1/043;
G02B 1/06; G02B 1/111; G02B 1/113;
G02B 19/0052; G02B 19/0076; G02B 2003/0093; G02B 2006/12061; G02B 2006/12078; G02B 2006/12109; G02B 21/02; G02B 21/086; G02B 21/12; G02B 23/2476; G02B 26/00; G02B 26/007; G02B 26/008; G02B 26/02; G02B 26/105; G02B 27/0961; G02B 27/0977; G02B 27/1026; G02B 27/1033; G02B 27/1086; G02B 27/144; G02B 27/4227; G02B 27/4238; G02B 3/0012; G02B 3/0037; G02B 3/0043; G02B 3/08; G02B 3/12; G02B 30/33; G02B 5/005; G02B 5/0268; G02B 5/12; G02B 5/136; G02B 5/1861; G02B 5/1895; G02B 5/226; G02B 5/283; G02B 5/284; G02B 5/3025; G02B 6/0045; G02B 6/0239; G02B 6/12004; G02B 6/1225; G02B 6/124; G02B 6/34; G02B 6/35; G02B 6/4206; G02B 1/00; G02B 1/08; G02B 1/118; G02B 15/00; G02B 17/0615; G02B 2006/12069; G02B 2006/12097; G02B 2006/12104; G02B 2006/12121; G02B 2006/12142; G02B 2006/12145; G02B 2006/12176; G02B 2027/0109; G02B 2027/012; G02B 2027/013; G02B 2027/0145; G02B 2027/0147; G02B 21/22; G02B 21/24; G02B 21/244; G02B 26/004; G02B 26/06; G02B 26/0841; G02B 26/0875; G02B 27/0018; G02B 27/0081; G02B 27/12; G02B 27/28; G02B 27/425; G02B 3/00; G02B 3/005; G02B 3/04; G02B 30/00; G02B 30/24; G02B 30/52; G02B 5/0284; G02B 5/08; G02B 5/18; G02B 5/1857; G02B 5/282; G02B 6/002; G02B 6/0028; G02B 6/003; G02B 6/0035; G02B 6/0046; G02B 6/0093; G02B 6/0095; G02B 6/02; G02B 6/12002; G02B 6/125; G02B 6/2706; G02B 6/293; G02B 6/29308; G02B 6/29311; G02B 6/29314; G02B 6/29395; G02B 6/3672; G02B 7/04; G02B 7/38

See application file for complete search history.

(56) References Cited

U.S. PATENT DOCUMENTS

| | | | | |
|---|---|---|---|---|
| 2007/0002334 A1* | 1/2007 | Altman | | G01M 11/0264 356/601 |
| 2008/0259354 A1* | 10/2008 | Gharib | | G02B 5/005 348/E13.005 |
| 2012/0081532 A1 | 4/2012 | Kumai | | |
| 2013/0155416 A1* | 6/2013 | Umemura | | G01B 11/2513 356/610 |
| 2015/0077143 A1 | 3/2015 | Maekawa | | |
| 2016/0191867 A1* | 6/2016 | Abraham | | G02B 27/0927 348/51 |
| 2017/0199028 A1* | 7/2017 | Tin | | G01B 11/22 |
| 2018/0327699 A1 | 11/2018 | Ota et al. | | |
| 2019/0120753 A1* | 4/2019 | Prater | | H01J 37/26 |
| 2021/0293537 A1* | 9/2021 | Ohno | | G02B 27/30 |
| 2022/0038625 A1 | 2/2022 | Gomi et al. | | |

FOREIGN PATENT DOCUMENTS

| | | | | |
|---|---|---|---|---|
| CN | 109087348 A | * | 12/2018 | G01B 11/00 |
| CN | 110230995 A | * | 9/2019 | G01B 11/25 |
| CN | 110319790 A | * | 10/2019 | |
| CN | 112771432 A | * | 5/2021 | G01N 21/1717 |
| CN | 113358220 A | * | 9/2021 | G01J 1/42 |
| CN | 114581298 A | * | 6/2022 | |
| EP | 0244640 A2 | * | 11/1987 | |
| JP | H3-200025 A | | 9/1991 | |
| JP | 2001-235427 A | | 8/2001 | |
| JP | 2008-209726 A | | 9/2008 | |
| JP | 2012-78504 A | | 4/2012 | |
| JP | 2015-59858 A | | 3/2015 | |
| JP | 2019-124542 A | | 7/2019 | |
| JP | 2021018079 A | * | 2/2021 | |
| KR | 20170046724 A | * | 5/2017 | |
| WO | WO-2016027797 A1 | * | 2/2016 | G01B 11/06 |
| WO | WO-2016136801 A1 | * | 9/2016 | G01B 11/00 |
| WO | WO 2017/073737 A1 | | 5/2017 | |
| WO | WO-2020016887 A1 | * | 1/2020 | C12Q 1/6818 |
| WO | WO 2020/068057 A1 | | 4/2020 | |
| WO | WO 2020/218282 A1 | | 10/2020 | |

OTHER PUBLICATIONS

A. Gatti et al., "Ghost Imaging with Thermal Light: Comparing Entanglement and Classical Correlation," Physical Review Letters, vol. 93, No. 9, pp. 093602-1 to 093602-4 (2004).

Alejandra Valencia et al., "Two-photon imaging with thermal light," Physical Review Letters, vol. 94, 063601, 4 pages (2005).

Jeffrey H. Shapiro, "Computational Ghost Imaging," Physical Review A, vol. 78, 061802, 4 pages (2008).

J.S. Kim, et al., "Multiaperture telecentric lens for 30 reconstruction," Optics Letters, vol. 36, No. 7, pp. 1050-1052 (2011).

Graham M. Gibson et al., "Single-pixel imaging 12 years on: a review," Optics Express, vol. 28, No. 19, pp. 28190-28208 (2020).

Ryan S. Bennink et al., "Two-Photon Coincidence Imaging with a Classical Source," Physical Review Letters, vol. 89, No. 11, pp. 113601-1 to 113601-4 (2002).

T.B. Pittman et al., "Optical imaging by means of two-photon quantum entanglement," Physical Review A vol. 52, No. 5, pp. R3429-R3432 (1995).

Walton L. Howes, "Rainbow schlieren and its applications," Appl. Optics, vol. 23, No. 14, pp. 2449-2460 (1984).

Japan Patent Office, Office Action in JP App. No. 2021-049153, 3 pages, and machine translation, 3 pages (Apr. 18, 2024).

* cited by examiner

OPTICAL APPARATUS, OPTICAL INSPECTION METHOD AND NON-TRANSITORY STORAGE MEDIUM

CROSS-REFERENCE TO RELATED APPLICATION

This application is based upon and claims the benefit of priority from Japanese Patent Application No. 2021-047701, filed Mar. 22, 2021, the entire contents of which are incorporated herein by reference.

FIELD

Embodiments described herein relate generally to an optical apparatus, an optical inspection method and a non-transitory storage medium.

BACKGROUND

Object inspection is conducted by optical apparatuses in a variety of industries. In the object inspection, as a method for obtaining detailed information on an object, there is, for example, single-pixel imaging (ghost imaging) using a single pixel (one pixel) having high light-receiving sensitivity. The single-pixel imaging requires shortening time for projecting a plurality of illumination light beams onto an object, that is, lead time.

DETAILED DESCRIPTION

According to an embodiment, an optical apparatus includes an illumination unit, a light-receiving unit and a processing unit. The illumination unit can illuminate an object with a plurality of pattern rays including rays with different wavelengths simultaneously. The light-receiving unit includes a pixel that can receive the rays from the object to disperse at least two of the different wavelengths included in the pattern rays. The processing unit acquires information on the object based on a result of the pixel of the light-receiving unit receiving the pattern rays with which the illumination unit illuminates the object simultaneously.

Embodiments will be described with reference to the drawings. The drawings are schematic or conceptual. The relationship between the thickness and width of each of the components or the size ratio between the components in the drawings is not always the same as the actual one. The components shown in the drawings may be different in dimension or ratio from the actual ones. Redundant descriptions will be omitted as appropriate.

The following embodiments and modification will be described on the assumption that the surface of an object transmits light, but the embodiments or the modification is not limited thereto. For example, if the object is not transparent to a ray, the surface of the object is a reflecting surface. In this case, the ray is reflected by the reflecting surface and enters a light-receiving unit.

First Embodiment

Figure 1:
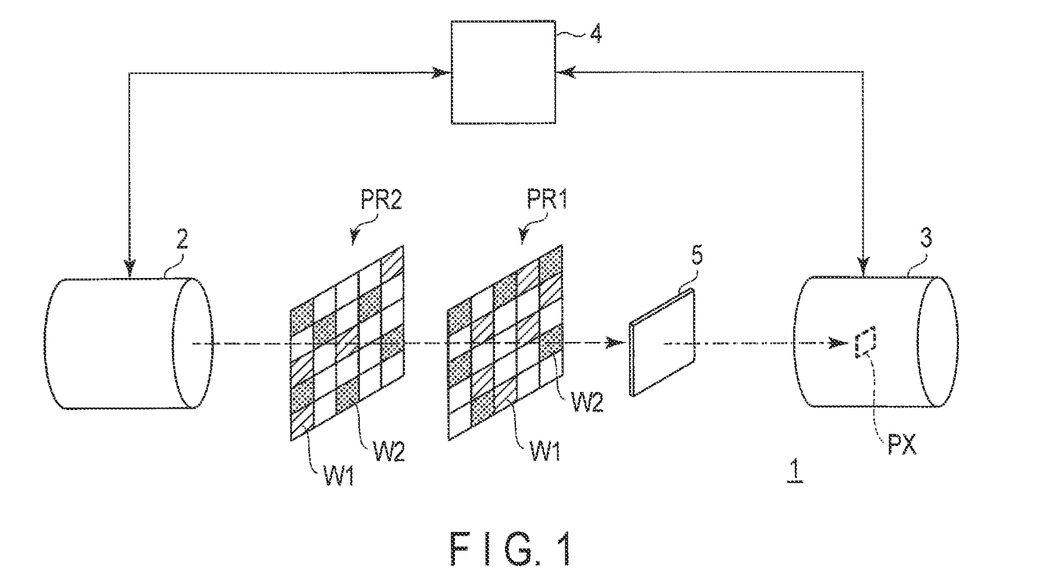
FIG. 1 is a schematic diagram showing an example of an optical apparatus according to a first embodiment.

FIG. 1 is a schematic diagram showing an optical apparatus 1 according to a first embodiment. The optical apparatus 1 includes an illumination unit 2, a light-receiving unit 3 and a processing unit 4. An object 5 reflects light. In the first embodiment, light is defined as an electromagnetic wave. The light is, for example, visible light, X rays, infrared rays, near infrared rays, far infrared rays and a microwave. The light may be coherent light or incoherent light. The light source of the illumination unit 2 has only to emit visible light. The visible light is light whose wavelength is, for example, 420 nm through 760 nm. The light source of the illumination unit 2 is, for example, a light emitting device (LED). Note that the illumination unit 2 may be a projector illumination unit.

The illumination unit 2 irradiates light toward the surface of the object 5. The illumination unit 2 can emit a plurality of rays having different wavelengths. In the first embodiment, the illumination unit 2 emits a first ray with a first wavelength and a second ray with a second wavelength. As one example, the first wavelength is 450 nm and the second wavelength is 650 nm. The illumination unit 2 projects illumination light onto the object 5. The illumination light projected by the illumination unit 2 is a pattern ray having a pattern. The pattern is the distribution of light intensities which varies from position to position in a section orthogonal or substantially orthogonal to the propagation direction of the illumination light. The pattern ray projected by the illumination unit 2 includes light with a first wavelength W1 and light with a second wavelength W2 whose patterns are different from each other. As shown in FIG. 1, the illumination unit 2 projects, for example, a first pattern ray PR1 and a second pattern ray PR2 onto the object 5. The illumination unit 2 first projects the first pattern ray PR1 onto the object 5 and then projects the second pattern ray PR2 onto the object 5. The first pattern ray PR1 and the second pattern ray PR2 have no correlation with each other.

The light-receiving unit 3 has an opening through which light is transmitted from outside. In the light-receiving unit 3, one or more independent pixels PX receive light through the opening. The pixels PX can receive the light by dispersing at least two of a plurality of wavelengths included in the light. In the first embodiment, the light-receiving unit 3 includes one pixel (single pixel) to dispersedly receive light projected from the illumination unit 2. When the light-receiving unit 3 receives the foregoing first pattern ray PR1 and second pattern ray PR2, the pixel PX disperses them into light with a first wavelength W1 and light with a second wavelength W2. Note that the light-receiving unit 3 may include a plurality of pixels PX.

The processing unit 4 is, for example, a computer. The processing unit 4 includes a central processing unit (CPU), a processor or an integrated circuit (control circuit) including an application specific integrated circuit (ASIC), a field programmable gate array (FPGA) or the like, and a non-transitory storage medium such as a memory. The processing unit 4 may include one or more processors or integrated circuits. The processing unit 4 performs a process based on programs and the like stored in the non-transitory storage medium.

The processing unit 4 acquires information on the object 5 in the optical apparatus 1. The information on the object 5 is based upon a result of illumination light (pattern ray) received by the light-receiving unit 3 and dispersed by the pixel PX. Note that the processing unit 4 may control the illumination unit 2 and the light-receiving unit 3. In this case, for example, the processing unit 4 may control them in synchronization with each other.

Figure 2:
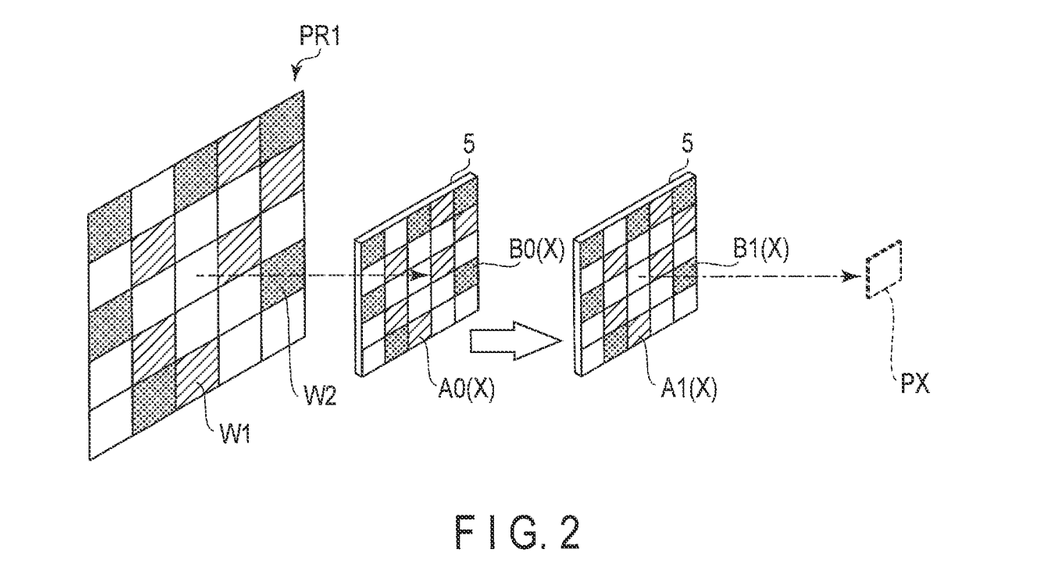
FIG. 2 is a schematic diagram showing a state from when a pattern ray is projected onto an object until the pattern ray is transmitted through the object and received by a pixel of a light-receiving unit in the optical apparatus according to the first embodiment.

As shown in FIG. 2, in the optical apparatus 1, the illumination unit 2 projects the first pattern ray PR1 onto the object 5 (the surface of the object 5) as illumination light. The intensity distribution of a projection pattern formed on the surface of the object 5 by the light with a first wavelength W1 included in the first pattern ray PR1 is defined as A0(X). The intensity distribution of a projection pattern formed on the surface of the object 5 by the light with a second wavelength W2 included in the first pattern ray PR1 is defined as B0(X). In these definitions, X is a vector representing a position on the surface of the object 5, that is, a position vector.

When the light with a first wavelength W1 included in the first pattern ray PR1 is transmitted through the object 5, the projection pattern intensity distribution A0(X) varies according to the transmittance distribution of the object. Similarly, when the light with a second wavelength W2 included in the first pattern ray PR1 is transmitted through the object 5, the projection pattern intensity distribution B0(X) varies according to the transmittance distribution of the object. Assuming that the rate at which the projection pattern varies according to the transmittance distribution of the object is T(X), the projection pattern intensity distribution A1(X) after the light with a first wavelength W1 included in the first pattern ray PR1 is transmitted through the object 5 is represented as A0(X)T(X). Similarly, the projection pattern intensity distribution B1(X) after the light with a second wavelength W2 is transmitted through the object 5 is represented as B0(X)T(X).

The pixel PX of the light-receiving unit 3 receives the light with a first wavelength W1 and the light with a second wavelength W2 which are included in the first pattern ray PR1 transmitted through the object 5. Since the pixel PX dispersedly receives the first pattern ray PR1, the light-receiving unit 3 acquires signal intensity IA for the light with a first wavelength W1 and signal intensity IB for the light with a second wavelength W2. Since, in the first embodiment, the pixel PX is a single pixel, the signal intensity IA is expressed as an integral of the projection pattern intensity distribution A1(X) that has changed through the object 5. Similarly, the signal intensity IB is expressed as an integral of the projection pattern intensity distribution B1(X) that has changed through the object 5. Note that X' is an integration variable.

$$IA = \int A1(X')dX' = \int A0(X')T0(X')dX' \quad (1)$$

$$IB = \int B1(X')dX' = \int B0(X')T0(X')dX' \quad (2)$$

The signal intensity (IA, IB) is a value obtained by integrating an integrand amount (A0×T, B0×T) over the entire surface of the object 5 with respect to the position vector X. In the integrand amount, an integrand amount (A0(X)T(X), B0(X)T(X)) in the position vector X has a large correlation with the projection pattern intensity distribution (A(X), B(X)) in the position vector X. On the other hand, an integrand amount (A0(Y)T(Y), B0(Y)T(Y)) in a position Y away from the position vector X has a small correlation with the projection pattern intensity distribution (A(X), B(X)) in the position vector X. Thus, when the signal intensity (IA, IB) and the projection pattern intensity distribution (A(X), B(X)) are correlated with each other, the projection pattern intensity distribution (A(X), B(X)) in the position vector X and the integrand amount (A0(X)T(X), B0(X)T(X)) in the position vector X are greatly correlated with each other. If, therefore, the product of the signal intensity (IA, IB) and the projection pattern intensity distribution (A0(X), B0(X)) in the position vector X is calculated, (A0(X)A0(X)T(X), B0(X)B0(X)T(X)) is obtained. That is, a value associated with the position vector X is left.

The intensity distribution of the first pattern ray PR1 is known because it is projected from the illumination unit 2. That is, in the first pattern ray PR1, the intensity distribution A0(X) of the light with a first wavelength W1 and the intensity distribution B0(X) of the light with a second wavelength W2 are known. The processing unit 4 can thus calculate the rate T(X) at which the projection pattern varies according to the transmittance distribution of the object from the signal intensity (IA, IB). Since T(X) depends on, e.g., the shape of the surface of the object 5, the processing unit 4 can calculate T(X) to obtain the shape of the surface of the object 5. The processing unit 4 thus acquires information on the position vector X and the surface of the object 5 close to the position vector X, based on the correlation between the signal intensity (IA, IB) and the projection pattern intensity distribution (A0(X), B0(X)). In other words, the processing unit 4 can perform the process as described above to acquire surface information at any position on the surface of the object 5. Therefore, the processing unit 4 can obtain image information of the object 5.

In the first embodiment, the illumination unit 2 projects the first pattern ray PR1 onto the object 5 (the surface of the object 5) and then projects the second pattern ray PR2 thereonto as illumination light. The intensity distribution of a projection pattern formed on the surface of the object 5 by the light with a first wavelength W1 included in the second pattern ray PR2 is defined as C0(X). The intensity distribution of a projection pattern formed on the surface of the object 5 by the light with a second wavelength W2 included in the second pattern ray PR2 is defined as D0(X).

Similarly to the case of the first pattern ray PR1, the pixel PX of the light-receiving unit 3 receives the second pattern ray PR2 to obtain signal intensity IC for the light with a first wavelength W1 and signal intensity ID for the light with a second wavelength W2. The processing unit 4 correlates the signal intensity (IA, IB, IC, ID) and the projection pattern intensity distribution (A0(X), B0(X), C0(X), D0(X)) with each other to obtain information on the position vector X and the surface of the object 5 close to the position vector X in the same manner as described above. The optical apparatus 1 thus obtains four signal intensities (IA, IB, IC, ID) and four projection pattern intensity distributions (A0(X), B0(X), C0(X), D0(X)) from the first pattern ray PR1 and the second pattern ray PR2. That is, in the optical apparatus 1, the number of signal intensities and the number of projection pattern intensity distributions are each larger than the number of pattern rays. The optical apparatus 1 of the first embodiment can thus obtain information on the shape of the object 5 more accurately.

Figure 3:
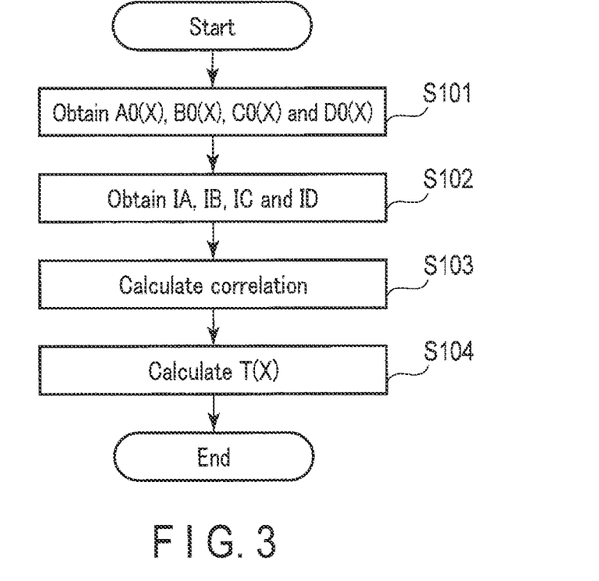
FIG. 3 is a flowchart showing an example of a process to be performed by a control unit of the optical apparatus according to the first embodiment.

FIG. 3 shows an example of a process to be performed by the processing unit 4 of the optical apparatus 1. The process shown in FIG. 3 is performed by the processing unit 4 each time a measurement operation is performed in the optical apparatus 1. The process shown in FIG. 3 is a process to be performed at least in one operation of the optical apparatus 1. Before the process is performed by the processing unit 4, the pixel PX of the light-receiving unit 3 receives the first pattern ray PR1 and second pattern ray PR2 emitted from the illumination unit 2 onto the surface of the object 5, as described above.

The processing unit 4 acquires, from the light-receiving unit 3, the intensity distribution A0(X) of the light with a first wavelength W1 included in the first pattern ray PR1, the intensity distribution B0(X) of the light with a second wavelength W2 included in the first pattern ray PR1, the intensity distribution C0(X) of the light with a first wavelength W1 included in the second pattern ray PR2, and the intensity distribution D0(X) of the light with a second wavelength W2 included in the second pattern ray PR2 (S101). The processing unit 4 acquires, from the light-receiving unit 3, the signal intensity IA of the light with a first wavelength W1 included in the first pattern ray PR1, the signal intensity IB of the light with a second wavelength W2 included in the first pattern ray PR1, the signal intensity IC of the light with a first wavelength W1 included in the second pattern ray PR2, and the signal intensity ID of the light with a second wavelength W2 included in the second pattern ray PR2 (S102). The processing unit 4 correlates the four signal intensities (IA, IB, IC, ID) and the four intensity distributions (A0(X), B0(X), C0(X), D0(X)) with each other (S103). Thus, the processing unit 4 calculates information T(X) on the surface of the object 5 (S104). Since the information T(X) on the surface of the object 5 is obtained as described above, the optical apparatus 1 can obtain image information of the object 5.

The optical apparatus 1 of the first embodiment includes the illumination unit 2, light-receiving unit 3 and processing unit 4. The illumination unit 2 can illuminate the object with a plurality of pattern rays including rays with different wavelengths simultaneously. The light-receiving unit 3 includes a pixel PX that can receive the rays from the object 5 to disperse at least two of the different wavelengths included in the pattern rays. The processing unit 4 acquires information on the object 5 based on a result of the pixel PX of the light-receiving unit 3 receiving the pattern rays with which the illumination unit 2 illuminates the object 5 simultaneously. The optical apparatus 1 of the first embodiment thus makes it possible to shorten time for projecting a plurality of illuminating rays onto an object. For example, even though the number of patterns of a pattern ray is increased, a plurality of pattern rays can be projected onto an object without lengthening time for projecting the pattern ray.

In the optical apparatus 1 of the first embodiment, it is preferable that the intensity distributions of the pattern rays be independent of each other. Thus, the intensity distributions of the pattern rays do not correlate with each other. Even though the object 5 is illuminated with the pattern rays at the same time, the processing unit 4 can obtain information on the object 5 as described above. Therefore, the optical apparatus 1 of the first embodiment makes it possible to shorten time for projecting a plurality of illuminating rays onto an object.

Second Embodiment

Figure 4:
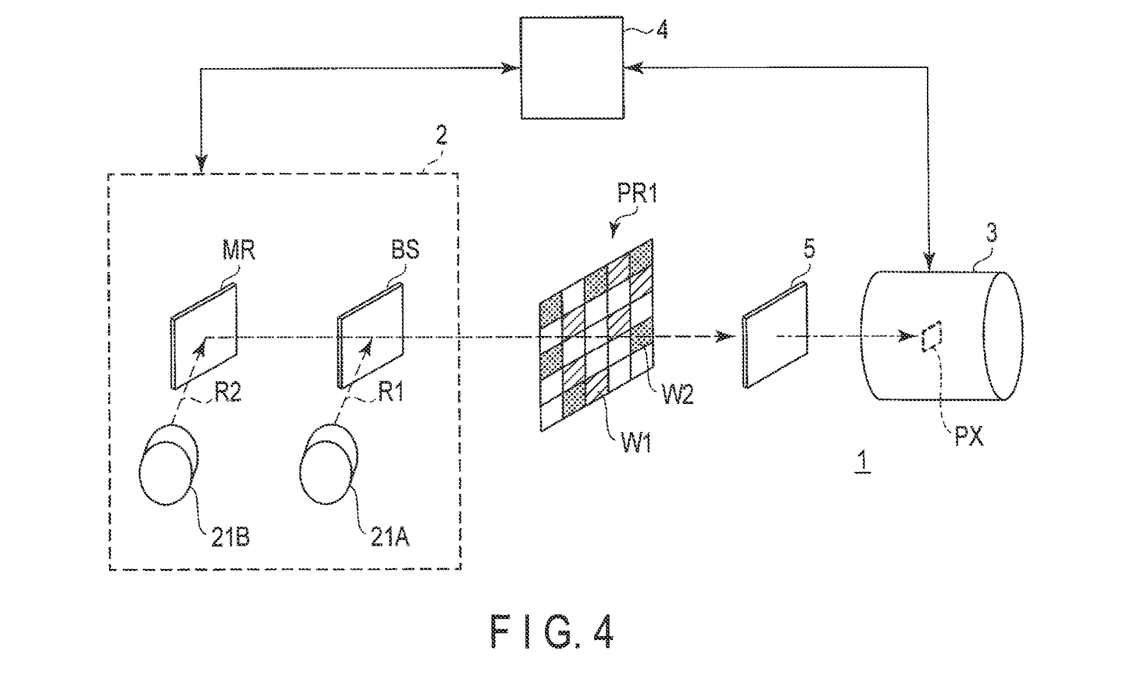
FIG. 4 is a schematic diagram showing an example of an optical apparatus according to a second embodiment.

FIG. 4 is a schematic diagram showing an optical apparatus 1 according to a second embodiment. The optical apparatus 1 according to the second embodiment is similar to the optical apparatus 1 according to the first embodiment described above, and includes an illumination unit 2, a light-receiving unit 3 and a processing unit 4.

In the optical apparatus 1 of the second embodiment, the illumination unit 2 includes a first illumination unit 21A, a second illumination unit 21B, a mirror MR and a beam splitter BS. The first illumination unit 21A emits a first ray R1 including light with a first wavelength W1. The first ray R1 emitted from the first illumination unit 21A is reflected by the beam splitter BS to illuminate an object 5. The second illumination unit 21B emits a second ray R2 including light with a second wavelength W2. The second ray R2 emitted from the second illumination unit 21B is reflected by the mirror MR and transmitted through the beam splitter BS to illuminate the object 5.

In the second embodiment, a first wavelength spectrum of the first ray R1 emitted from the first illumination unit 21A and a second wavelength spectrum of the second ray R2 emitted from the second illumination unit 21B differ from each other, and their wavelength regions do not overlap each other. That is, the first wavelength spectrum and the second wavelength spectrum are wavelength spectra whose wavelength regions are independent of each other.

Like in the foregoing first embodiment, in the second embodiment, too, the illumination unit 2 projects a first pattern ray PR1, as illumination light, onto the object 5 (the surface of the object 5), as shown in FIG. 4. Since, in the second embodiment, the illumination unit 2 includes the first and second illumination units 21A and 21B, the first pattern ray PR1 is generated by the first illumination unit 21A emitting the first ray R1 including the light with a first wavelength W1 and the second illumination unit 21B emitting the second ray R2 including the light with a second wavelength W2. The first pattern ray PR1 is dispersed by the light-receiving unit 3 and received by the pixel PX in the same manner as in the foregoing first embodiment. Based on the correlation between the signal intensity (IA, IB) and the projection pattern intensity distribution (A0(X), B0(X)), the processing unit 4 calculates a rate T(X) at which the projection pattern varies with the object transmittance distribution to acquire the shape of the surface of the object 5, in the same manner as in the foregoing first embodiment.

However, in the optical apparatus 1 of the second embodiment, the wavelength spectrum of the first ray R1 and the wavelength spectrum of the second ray R2 are independent of each other. Therefore, when the signal intensity (IA, IB) and the projection pattern intensity distribution (A0(X), B0(X)) are correlated with each other, it is a projection pattern intensity distribution A(X) that is substantially correlated with the signal intensity IA, and it is a projection pattern intensity distribution B(X) that is substantially correlated with the signal intensity IB. That is, a projection pattern formed by the first illumination light R1 and a projection pattern formed by the second illumination light R2 are not substantially correlated with each other. In the optical apparatus 1 of the second embodiment, therefore, the pattern ray generated by the first illumination unit 21A and the pattern ray generated by the second illumination unit 21B can simultaneously be projected onto the object 5 as one first pattern ray PR1. The optical apparatus 1 of the second embodiment makes it possible to shorten time for projecting a plurality of illuminating rays onto an object.

As described above, the structure of the illumination unit 2 of the second embodiment differs from that of the illumination unit 2 of the first embodiment, but the illumination unit 2 of the second embodiment can illuminate the object 5 with a plurality of pattern rays including light having different wavelengths at the same time, as in the first embodiment. The processing unit 4 thus performs the same process as in the first embodiment. That is, the processing unit 4 executes steps S101 to S104 shown in FIG. 4. Therefore, the optical apparatus 1 brings about the same functions and advantages as those of the first embodiment.

The second embodiment brings about the following function and advantage in addition to the same functions and advantages as those of the first embodiments described above. The optical apparatus 1 of the second embodiment includes a wavelength region whose pattern rays are independent of each other. The light-receiving unit 3 can disperse a plurality of pattern rays to a wavelength region corresponding to each of the pattern rays. The optical apparatus 1 of the second embodiment can obtain information on the shape of the object 5 more accurately.

Third Embodiment

Figure 5:
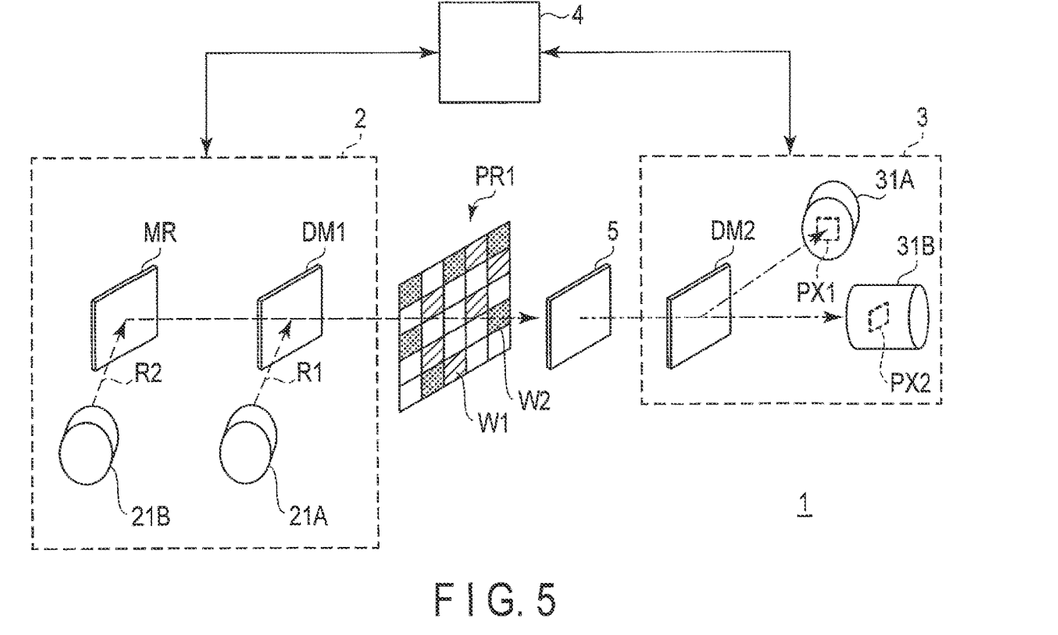
FIG. 5 is a schematic diagram showing an example of an optical apparatus according to a third embodiment.

FIG. 5 is a schematic diagram showing an optical apparatus 1 according to a third embodiment. The optical apparatus 1 of the third embodiment is similar to that of each of the foregoing embodiments, and includes an illumination unit 2, a light-receiving unit 3 and a processing unit 4. In the optical apparatus 1 shown in FIG. 5, the illumination unit 2 and light-receiving unit 3 are each configured to disperse light (first illumination unit 21A, second illumination unit 21B, first light-receiving unit 31A, second light-receiving unit 31B), but the optical apparatus 1 is not limited to the configuration. In the optical apparatus 1 of the third embodiment, at least the light-receiving unit 3 has only to be configured to disperse light (first light-receiving unit 31A, second light-receiving unit 31B).

In the optical apparatus 1 of the third embodiment, the illumination unit 2 includes a first illumination unit 21A, a second illumination unit 21B, a mirror MR and a dichroic mirror (first dichroic mirror) DM1. The first illumination unit 21A emits a first ray R1, and the first ray R1 is reflected by the dichroic mirror DM1 and applied to the object 5. The second illumination unit 21B emits a second ray R2 including light with a second wavelength W2. The second ray R2 is reflected by the mirror MR and applied to the object 5 through the dichroic mirror DM1.

In the third embodiment, too, the first wavelength spectrum of the first ray R1 emitted from the first illumination unit 21A and the second wavelength spectrum of the second ray R2 emitted from the second illumination unit 21B differ from each other, and their wavelength regions do not overlap each other. That is, the first wavelength spectrum and the second wavelength spectrum are wavelength spectra whose wavelength regions are independent of each other.

The light-receiving unit 3 includes a dichroic mirror (second dichroic mirror) DM2, a first light-receiving unit 31A and a second light-receiving unit 31B. When the light-receiving unit 3 receives the first ray R1, the first ray R1 is reflected by the dichroic mirror DM2 and enters the first light-receiving unit 31A. When the light-receiving unit 3 receives the second ray R2, the second ray R2 enters the second light-receiving unit 31B through the dichroic mirror DM2.

Like in the foregoing embodiments, in the third embodiment, too, the illumination unit 2 projects a first pattern ray PR1, as illumination light, onto the object 5 (the surface of the object 5), as shown in FIG. 5. Since, in the third embodiment, the illumination unit 2 includes the first and second illumination units 21A and 21B, the first pattern ray PR1 is generated by the first illumination unit 21A emitting the first ray R1 including the light with a first wavelength W1 and the second illumination unit 21B emitting the second ray R2 including the light with a second wavelength W2. That is, in the optical apparatus 1 of the third embodiment, the dichroic mirror DM1 generates the first pattern ray PR1.

In the first pattern ray PR1, the first ray R1 is reflected by the dichroic mirror DM2 and received by the pixel PX1 of the first light-receiving unit 31A, and the second ray R2 is transmitted through the dichroic mirror DM2 and received by the pixel PX2 of the second light-receiving unit 31B. That is, the dichroic mirror DM2 disperses each of the pattern rays to the wavelength regions which are independent of each other. The first light-receiving unit 31A acquires signal intensity IA and the second light-receiving unit 31B acquires signal intensity IB. Based on the correlation between the signal intensity (IA, IB) and the projection pattern intensity distribution (A0(X), B0(X)), the processing unit 4 calculates a rate T(X) at which the projection pattern varies with the object transmittance distribution to acquire the shape of the surface of the object 5, in the same manner as in the foregoing embodiments.

However, in the optical apparatus 1 of the third embodiment, the wavelength spectrum of the first ray R1 and the wavelength spectrum of the second ray R2 are independent of each other. In addition, in the light-receiving unit 3, the first ray R1 including the light with a first wavelength W1 and the second ray R2 including the light with a second wavelength W2 are completed separated from each other by the dichroic mirror DM2. That is, the wavelength regions of the first and second rays R1 and R2 are completely separated, and so are the projection patterns formed by the first and second rays R1 and R2. Therefore, when the signal intensity (IA, IB) and the projection pattern intensity distribution (A0(X), B0(X)) are correlated with each other, the signal intensity IA is substantially correlated with the projection pattern intensity distribution A(X), and the signal intensity IB is substantially correlated with the projection pattern intensity distribution B(X). In other words, the projection patterns formed by the first and second rays R1 and R2 are not substantially correlated with each other. In the optical apparatus 1 of the third embodiment, therefore, even though the pattern rays generated by the first and second illumination units 21A and 21B are projected onto the object 5 as one first pattern ray PR1, the two pattern rays can be completely separated by the light-receiving unit 3.

As described above, the third embodiment differs from the foregoing first and second embodiments in the structures of the illumination unit 2 and light-receiving unit 3, but the illumination unit 2 of the third embodiment can illuminate the object 5 with a plurality of pattern rays including light having different wavelengths at the same time, as in the first and second embodiments. In addition, the light-receiving unit 3 can disperse each of the pattern rays with its corresponding wavelength. The processing unit 4 thus performs the same process as in the first embodiment. That is, the processing unit 4 executes steps S101 to S104 shown in FIG. 4. Therefore, the optical apparatus 1 of the third embodiment brings about the same functions and advantages as those of the first and second embodiments.

The third embodiment brings about the following function and advantage in addition to the same functions and advantages as those of the first and second embodiments described above. In the light-receiving unit 3 of the optical apparatus 1 of the third embodiment, the first ray R1 including the light with a first wavelength W1 and the second ray R2 including the light with a second wavelength W2 are completely separated from each other by the dichroic mirror DM2. The optical apparatus 1 of the third embodiment can thus obtain information on the shape of the object 5 more accurately.

(Modification to Third Embodiment)

The illumination unit 2 may project projection pattern rays having three or more different wavelengths to the object 5. The illumination unit 2 is, for example, a three-plate type projector illumination unit and, in this case, the light-receiving unit 3 includes a plurality of (two or more) dichroic mirrors. The light-receiving unit 3 receives projection pattern rays having three or more different wavelengths, which are projected to the object 5 from the illumination unit 2. The light-receiving unit 3 separates the projection pattern rays through the dichroic mirrors as described above. The processing unit 4 acquires the shape of the surface of the object 5 based on the signal intensity and its corresponding projection pattern intensity distribution.

In addition, the illumination unit 2 may project projection pattern rays having N different wavelengths to the object 5 (N is a natural number of 2 or more) and, in this case, the illumination unit 2 includes (N−1) dichroic mirrors and N illumination units. The light-receiving unit 3 includes (N−1) dichroic mirrors. The light-receiving unit 3 receives projection pattern rays having N different wavelengths, which are projected to the object 5 from the illumination unit 2. The light-receiving unit 3 separates the projection pattern rays through the dichroic mirrors as described above. The processing unit 4 acquires the shape of the surface of the object 5 based on the signal intensity and its corresponding projection pattern intensity distribution. Note that the dichroic mirrors included in the illumination unit 2 and light-receiving unit 3 may be diffractive optical elements DOE1 and DOE2 (see FIG. 6).

Figure 6:
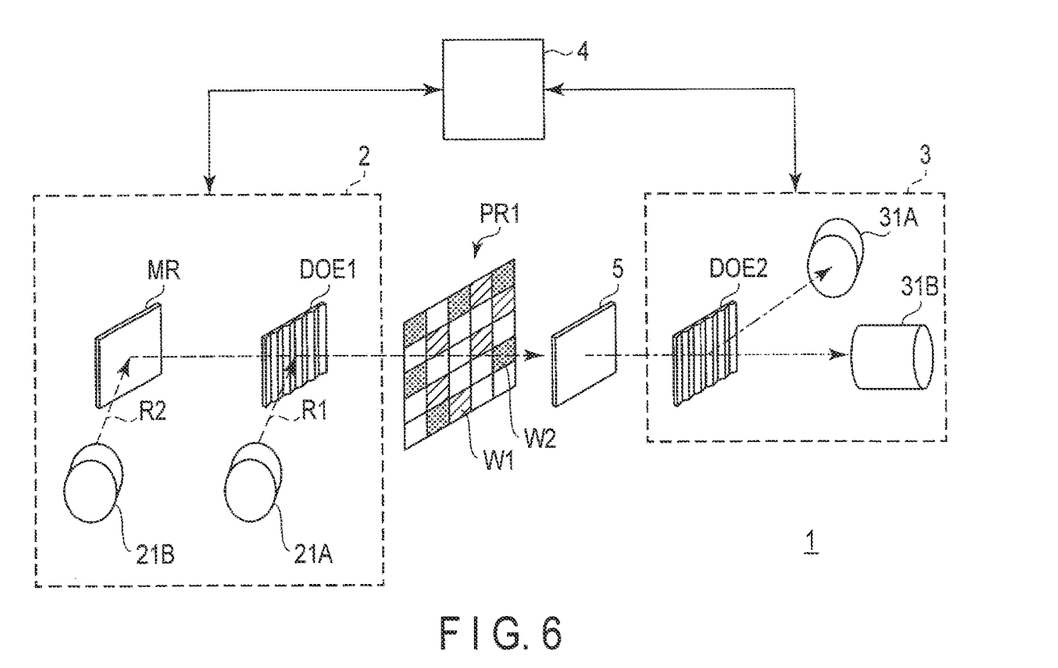
FIG. 6 is a schematic diagram showing an example of an optical apparatus according to a modification to the third embodiment.

As described above, the present modification differs from the foregoing first to third embodiments in the structures of the illumination unit 2 and light-receiving unit 3, but the illumination unit 2 of the modification can illuminate the object 5 with a plurality of pattern rays including light having different wavelengths at the same time, as in the foregoing embodiments. The light-receiving unit 3 can disperse each of the pattern rays with its corresponding wavelength. The processing unit 4 thus performs the same process as in the first embodiment. That is, the processing unit 4 executes steps S101 to S104 shown in FIG. 4. Therefore, the optical apparatus 1 of the modification brings about the same functions and advantages as those of the foregoing embodiments.

Fourth Embodiment

Figure 7:
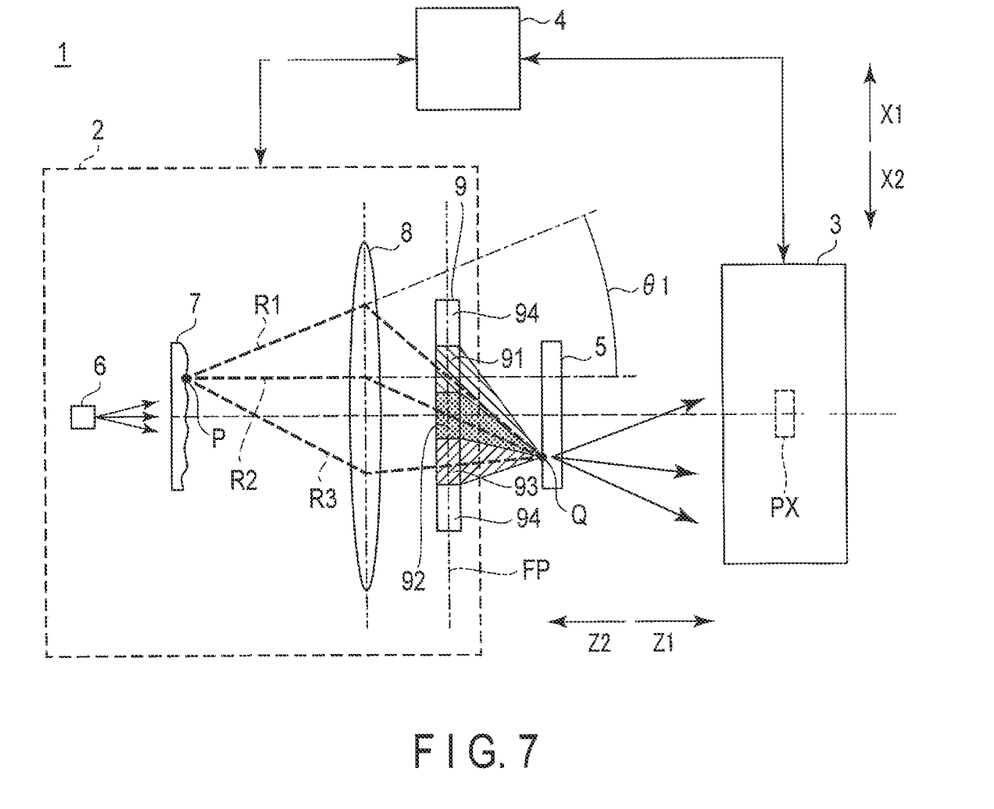
FIG. 7 is a schematic diagram showing an example of an optical apparatus according to a fourth embodiment.

FIG. 7 is a schematic diagram showing an optical apparatus 1 according to a fourth embodiment. The optical apparatus 1 of the fourth embodiment is similar to that of each of the foregoing embodiments, and includes an illumination unit 2, a light-receiving unit 3 and a processing unit 4. The illumination unit 2 includes a light source 6, a rough surface unit 7, an imaging optical device 8 and a ray selection unit 9. In FIG. 7, an optical axis direction parallel or substantially parallel to the optical axis of the imaging optical device 8 (indicated by arrows Z1 and Z2), a first direction parallel or substantially parallel to the focal plane FP of the imaging optical device 8 and orthogonal or substantially orthogonal to the optical axis direction (indicated by arrows X1 and X2), and a second direction intersecting both the optical axis direction and the first direction are defined. In the fourth embodiment, the light source 6, rough surface unit 7, imaging optical device 8 and ray selection unit 9 are arranged in the order presented in the illumination unit 2 along the optical axis direction. The illumination unit 2, object 5 and light-receiving unit 3 are arranged in the order presented along the optical axis direction. That is, in the optical apparatus 1, the light source 6, rough surface unit 7, imaging optical device 8, ray selection unit 9, object 5 and light-receiving unit 3 are arranged in the order presented along the optical axis direction.

The light source 6 is a light source of the illumination unit 2. The light source 6 is, for example, a halogen lamp, a xenon lamp, an LED and a laser light source. The light source 6 is not particularly limited thereto as long as it emits electromagnetic waves such as X-rays, ultraviolet rays, infrared rays, millimeter waves and microwaves. In the fourth embodiment, the light source 6 emits at least light with a first wavelength W1, light with a second wavelength W2 and light with a third wavelength W3. As one example, the first wavelength is 450 nm, the second wavelength is 650 nm and the third wavelength is 550 nm.

The rough surface unit 7 transmits rays that strike thereto. The rays transmitted by the rough surface unit 7 have a plurality of wavelengths and are propagated in different directions. When the rough surface of the rough surface unit 7 is moderately roughened, the rays having a plurality of wavelengths transmitted by the rough surface unit 7 are propagated in different directions (randomly) without being correlated with each other.

The imaging optical device 8 substantially images an object point P, which is on the rough surface, on an image point Q on the surface of the object. The imaging optical device 8 also images a ray incident from an infinite distance on the focal plane FP. The imaging optical device 8 is not limited to a particular one as long as it images the object point P on the image point Q. The imaging optical device 8 is, for example, a single lens, a doublet lens, a convex mirror, and a combination thereof. The position of the ray incident on the imaging optical device 8, which passes through the focal plane FP, depends on the incident direction of the ray. That is, in FIG. 7, a ray incident on the imaging optical device 8 at a ray angle θ1 passes through the same position on the focal plane FP if the ray angle θ1 is the same value. As one example, when the ray angle θ1 is zero, that is, when a ray enters the imaging optical device 8 along the optical axis thereof, it passes through a point at which the focal plane FP and the optical axis intersect.

The ray selection unit 9 is provided to coincide with the focal plane FP of the imaging optical device 8. The ray selection unit 9 includes at least two selection areas. Each of the selection areas is, for example, a color filter that transmits a ray with a specific wavelength range and blocks transmission of a ray whose wavelength range is outside the specific wavelength range. When a ray reaches a selection area, a wavelength range specific to the selection area light passes the selection area and, in other words, light having a wavelength range specific to the selection area can be transmitted through the selection area. In the fourth embodiment, the ray selection unit 9 includes a first selection area 91, a second selection area 92 and a third selection area 93. The wavelength ranges of rays transmitted through the first, second and third selection areas 91, 92 and 93 are different from each another. That is, the three wavelength ranges are different from and independent of one another. The first selection area 91 transmits light with a wavelength range including a first wavelength W1, the second selection area 92 transmits light with a wavelength range including a second wavelength W2, and the third selection area 93 transmits light with a wavelength range including a third wavelength W3. Note that the ray selection unit 9 includes a diaphragm unit 94 that transmits no light.

As shown in FIG. 7, in the fourth embodiment, the rays emitted from the light source 6 are transmitted through the rough surface of the rough surface unit 7 and thus propagated in random directions as indicated by first, second and third rays R1, R2 and R3. The first ray R1 includes light with a first wavelength W1, the second ray R2 includes light with a second wavelength W2, and the third ray R3 includes light with a third wavelength W3. The first to third rays R1 to R3 are imaged by the imaging optical device 8 and directed to the image point Q on the surface of the object.

The first ray R1 is transmitted through the first selection area 91 of the ray selection unit 9. Accordingly, the ray selection unit 9 transmits light of the first ray R1, which has a wavelength range including the first wavelength W1. The second ray R2 is transmitted through the second selection area 92 of the ray selection unit 9. Accordingly, the ray selection unit 9 transmits light of the second ray R2, which has a wavelength range including the second wavelength W2. The third ray R3 is transmitted through the third selection area 93 of the ray selection unit 9. Accordingly, the ray selection unit 9 transmits light of the third ray R3, which has a wavelength range including the third wavelength W3.

Thus, the first, second and third rays R1, R2 and R3, which have been transmitted through the ray selection unit 9, include wavelength areas that are independent of one another. In other words, the wavelength spectra of the first to third rays R1 to R3 are independent of one another. Then, the first to third rays R1 to R3 are imaged on the image point Q on the object 5. In addition, the first to third rays R1 to R3 are transmitted through the object 5, dispersed by the light-receiving unit 3, and are received by the pixel PX.

Like in the foregoing embodiments, the wavelength spectra of the first to third rays R1, R2 and R3 received by the light-receiving unit 3 are independent of each other. Thus, the first to third rays R1, R2 and R3 are not substantially correlated with one another. In the optical apparatus 1 of the fourth embodiment, therefore, the first to third rays R1, R2 and R3 can completely be separated into three rays by the light-receiving unit 3 even though they are projected on the object 5 at the same time or at almost the same time. As in the foregoing embodiments, based on the correlation between the signal intensity and the projection pattern intensity distribution, the processing unit 4 calculates a rate at which a projection pattern varies with the transmittance distribution of the object to acquire the shape of the surface of the object 5.

As described above, the fourth embodiment differs from the foregoing first to third embodiments in the structure of the illumination unit 2, but the illumination unit 2 of the fourth embodiment can illuminate the object 5 with a plurality of pattern rays including light having different wavelengths at the same time, as in the foregoing embodiments. The processing unit 4 thus performs the same process as in the first embodiment. That is, the processing unit 4 executes steps S101 to S104 shown in FIG. 4. Therefore, the optical apparatus 1 of the fourth embodiment brings about the same functions and advantages as those of the foregoing embodiments.

In the optical apparatus 1 of at least one of the foregoing embodiments, the illumination unit 2 can illuminate an object with a plurality of pattern rays including rays with different wavelengths simultaneously. The light-receiving unit 3 includes a pixel PX that can receive the rays from the object to disperse at least two of the different wavelengths included in the pattern rays. The processing unit 4 acquires information on the object 5 based on a result of the pixel PX of the light-receiving unit 3 receiving the pattern rays with which the illumination unit 2 illuminates the object 5 simultaneously.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical apparatus comprising:
    an illumination unit including a light source that illuminates an object with a plurality of pattern rays including rays with different wavelengths simultaneously;
    a light-receiving unit including an opening through which light is transmitted and a pixel which is configured to receive the rays from the object through the opening, the light-receiving unit being configured to disperse at least two of the different wavelengths included in the pattern rays; and
    a processor programmed to acquire information on the object by single-pixel imaging based on the at least two of the different wavelengths dispersed by the light-receiving unit receiving the pattern rays with which the illumination unit illuminates the object simultaneously.

2. The optical apparatus of claim 1, wherein the pattern rays have intensity distributions that are independent of one another.

3. The optical apparatus of claim 1, wherein:
    the pattern rays include wavelength ranges which have the different wavelengths and are independent of one another; and
    the light-receiving unit is configured to the pattern rays into the wavelength ranges of the pattern rays.

4. The optical apparatus of claim 3, wherein the illumination unit includes a first dichroic mirror which generates the pattern rays having the wavelength ranges that are independent of one another.

5. The optical apparatus of claim 3, wherein the light-receiving unit further includes a second dichroic mirror which disperses the pattern rays into the wavelength ranges that are independent of one another.

6. The optical apparatus of claim 3, wherein the light-receiving unit further includes a diffractive optical element which disperses the pattern rays into the wavelength ranges that are independent of one another.

7. The optical apparatus of claim 1, wherein the illumination unit includes:
    an imaging optical device which includes at lease one of a lens or a mirror that images a ray incident from a light source on a focal plane; and
    a ray selection unit located on the focal plane of the imaging optical device and including a plurality of selection areas each comprising a color filter to perform at least one of transmission and reflection of a ray corresponding to a wavelength range of each of the selection areas.

8. An optical apparatus comprising a processor programmed to acquire information on an object to illuminate the object with a plurality of pattern rays including rays with different wavelengths simultaneously, wherein:
the processor is programmed to respectively acquire signal intensity corresponding to each of the different wavelengths included in the pattern rays with which the object is illuminated simultaneously; and
the processor is programmed to acquire information on a surface of the object by single-pixel imaging based on respective correlations between the signal intensity and intensity distribution of the pattern ray corresponding to each of the different wavelengths.

9. An optical inspection method comprising:
illuminating an object with a plurality of pattern rays including rays with different wavelengths simultaneously;
receiving the rays from the object;
dispensing the pattern rays with the different wavelengths corresponding to the pattern rays; and
acquiring information on the object by single-pixel imaging based on the dispersed different wavelengths.

10. A non-transitory storage medium storing an optical inspection program, the optical inspection program causing a computer to implement:
respectively acquire signal intensity corresponding to each of the different wavelengths included in a plurality of pattern rays with which an object is illuminated simultaneously; and
acquire information on a surface of the object by single-pixel imaging based on respective correlations between the signal intensity and intensity distribution of the pattern ray corresponding to each of the different wavelengths.

11. The optical apparatus according to claim 8, wherein the processing unit is configured to acquire the respective correlations each time the object is illuminated with the pattern rays.

12. The non-transitory storage medium according to claim 10, wherein the optical inspection program causing the computer to implement acquiring the respective correlations each time the object is illuminated with the pattern rays.

* * * * *

UNITED STATES PATENT AND TRADEMARK OFFICE
CERTIFICATE OF CORRECTION

PATENT NO. : 12,123,703 B2
APPLICATION NO. : 17/462829
DATED : October 22, 2024
INVENTOR(S) : Ohno et al.

Page 1 of 1

It is certified that error appears in the above-identified patent and that said Letters Patent is hereby corrected as shown below:

In the Claims

Claim 7, Column 12, Line 59, "includes at lease one" should read --includes at least one--.

Signed and Sealed this
Fourth Day of March, 2025

Coke Morgan Stewart
*Acting Director of the United States Patent and Trademark Office*